W. F. CRANSTON.
Coffee and Peanut Roaster.
No. 205,787. Patented July 9, 1878.
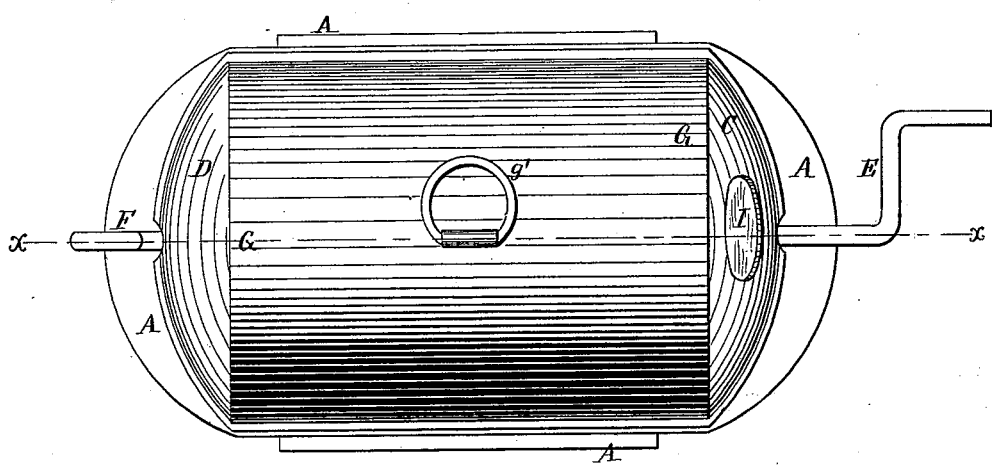
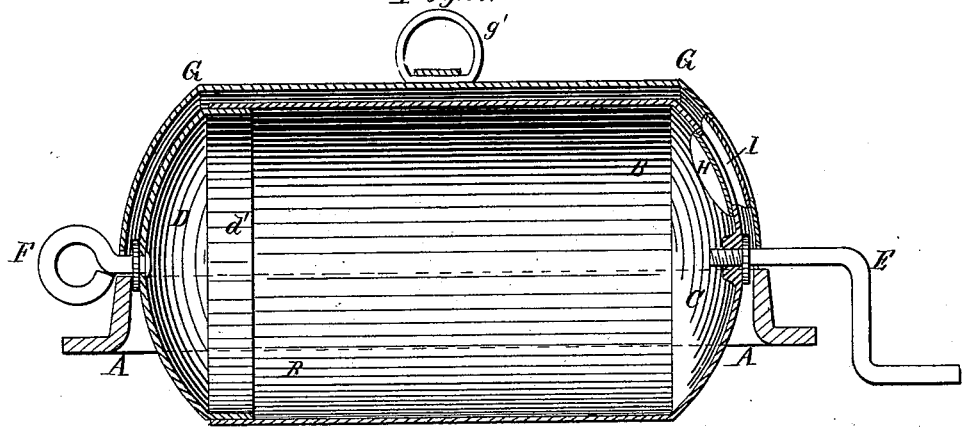
WITNESSES:
Henry N. Miller
C. Sedgwick
INVENTOR:
W. F. Cranston
BY Munn & Co.
ATTORNEYS.

UNITED STATES PATENT OFFICE.

WALTER F. CRANSTON, OF WEST MIDDLEBURG, OHIO.

IMPROVEMENT IN COFFEE AND PEA-NUT ROASTERS.

Specification forming part of Letters Patent No. 205,787, dated July 9, 1878; application filed May 31, 1878.

*To all whom it may concern:*

Be it known that I, WALTER FRENCH CRANSTON, of West Middleburg, in the county of Logan and State of Ohio, have invented a new and useful Improvement in Coffee and Pea-Nut Roasters, of which the following is a specification:

Figure 1 is a top view of my improved roaster. Fig. 2 is a vertical longitudinal section of the same, taken through the line $x\,x$, Fig. 1.

Similar letters of reference indicate corresponding parts.

The object of this invention is to furnish an improved roaster, for the use of dealers, farmers, and others, for roasting coffee and peanuts for retail or for private use, which will enable the coffee and pea-nuts to be roasted evenly and quickly, which will prevent the smoke and odor from escaping into the room, and which at the same time shall be simple in construction, convenient in use, and inexpensive in manufacture.

The invention consists in the combination of the iron frame and the cylinder, provided with a stationary head and a detachable crank-pivot at one end and a detachable head and a handle-pivot at the other end, and having a mica plate secured in an opening in one of its heads.

A is a frame, made of cast-iron or strong sheet-iron, and of such a shape and size as to fit into the opening in the top of a cooking stove or range. B is a cylinder, made of strong sheet-iron, and of such size as to fit into the cavity of the frame A. I prefer to make the cylinder B with convex heads C D. The head C is permanently attached to the cylinder B, and is provided with a screw-socket in its center, into which is screwed the stem or shaft of a crank, E, by which the said cylinder is turned, and which rests in a notch in the upper edge of one end of the frame A. The other head, D, is detachable, being made with a flange, $d'$, which fits into the end of the cylinder B.

To the center of the head D is permanently attached a pivot, F, which rests in a notch in the upper edge of the end of the frame A. Upon the outer end of the pivot F is formed a handle, for convenience in attaching and detaching the removable head D.

To the crank E and the pivot F are attached, or upon them are formed, washers or shoulders, which rest against the end of the frame A, to keep the cylinder B in place and prevent the detachable head D from coming off.

G is semi-cylindrical cover, the edges of which rest upon the upper edge of the frame A, to prevent any smoke and odor from escaping into the room, and compel the said smoke and odor to pass down between the cylinder B and the frame A into the fire. The cover G is provided with a handle, $g'$, for convenience in removing and applying it.

In one of the heads of the cylinder B, preferably the stationary one, is formed an opening, in which is secured a mica plate, H, to enable the progress of the roasting to be inspected without opening the cylinder B.

In the end of the cover G is formed an opening corresponding in position with the opening in the head of the cylinder B, and in which is secured a mica plate, I, so that the progress of the roasting may be inspected without removing the cover G.

To fill and empty the cylinder B, it is removed from the frame A, the crank-pivot E is screwed out, the cylinder is set on end, the detachable head D is detached by means of the handle-pivot F, and the coffee or peanuts are put in or taken out. The detachable head D may then be put on, the crank E screwed in, and the cylinder replaced in the frame A.

Having thus described my invention, I claim as new and desire to secure by Letters Patent—

The combination of the iron frame A and the cylinder B, provided with a stationary head, C, and a detachable crank-pivot, E, at one end, and a detachable head, D, and a handle-pivot, F, at the other end, and having a mica plate, H, secured in an opening in one of its heads, substantially as herein shown and described.

WALTER FRENCH CRANSTON.

Witnesses:
 E. S. CALLENDAR,
 J. W. CRANSTON.